United States Patent [19]
Thrash et al.

[11] Patent Number: 5,299,215
[45] Date of Patent: Mar. 29, 1994

[54] RARE EARTH ION UPCONVERSION LASER SYSTEM

[75] Inventors: Robert J. Thrash, St. Charles, Ill.; Leo F. Johnson, Bedminster, N.J.

[73] Assignee: Amoco Corporation, Chicago, Ill.

[21] Appl. No.: 765,381

[22] Filed: Sep. 25, 1991

[51] Int. Cl.⁵ .............................................. H01S 3/16
[52] U.S. Cl. ...................................... 372/41; 372/68; 372/69
[58] Field of Search ...................... 372/69, 41, 66, 68, 372/70, 71

[56] References Cited

U.S. PATENT DOCUMENTS

| | | | |
|---|---|---|---|
| 3,949,319 | 4/1976 | Tofield et al. | 372/71 |
| 4,782,494 | 11/1988 | Pollack et al. | 372/39 |
| 5,003,547 | 3/1991 | Esterowitz et al. | 372/41 |
| 5,008,890 | 4/1991 | McFarlane | 372/41 |
| 5,022,040 | 6/1991 | Pollack et al. | 372/41 |
| 5,088,103 | 2/1992 | Esterowitz et al. | 372/41 |
| 5,117,437 | 5/1992 | Rand | 372/41 |

Primary Examiner—Leon Scott, Jr.
Attorney, Agent, or Firm—Stephen G. Mican

[57] ABSTRACT

An upconversion laser system that uses solid state components throughout and achieves such operation with a continuous or quasi-continuous single band infrared pumping source using successive energy transfers between the sensitizer and activator in the host of the lasant upconversion material.

48 Claims, 2 Drawing Sheets

RARE EARTH ION UPCONVERSION LASER SYSTEM

BACKGROUND OF THE INVENTION

This invention relates to lasers that produce coherent radiation that has a shorter wavelength than the wavelength of the pumping radiation, and more particularly to lasers that use a rare earth doped solid state lasing medium under ambient temperature conditions to provide upconverted laser radiation in the blue, green, red and infrared portions of the electromagnetic spectrum.

Laser systems that produce wavelengths in the blue and green portions of the visible spectrum are highly desirable for a variety of applications. These applications include laser based video display systems and optical systems wherein the higher resolutions afforded by short optical wavelengths are important, such as optical storage systems.

Although laser systems have been developed that produce outputs in the blue and green portions of the visible spectrum, the value of such systems have been diminished by one or more factors that include high cost, critical alignment and high maintenance. For instance, rare gas ion lasers have both a high purchase price and a high degree of maintenance. Frequency doubling or summing lasers that employ a nonlinear element require critical alignment and high maintenance.

A laser source that uses solid state components throughout and employs a single diode pumping source is a desirable configuration for a low cost, low maintenance system, but such lasers have never been able to achieve operation in the blue and green regions of the visible spectrum under normal ambient temperature operating conditions. Furthermore, the prior art has not been able to achieve such operation with a continuous or quasi-continuous pumping source.

SUMMARY OF THE INVENTION

The invention comprises a solid state laser system with a lasant material that comprises a host doped with an activator material that produces coherent radiation in the blue, green, red and infrared regions of the electromagnetic spectrum and a sensitizer that allows the lasing material to be pumped with infrared radiation provided by a single band infrared pumping source. The infrared pumping source conveniently comprises a solid state infrared laser source such as a laser diode.

In the preferred embodiment, the invention comprises an active lasant material comprising a host, an activator comprising a concentration of rare earth ions in said host for producing coherent radiation having a shorter wavelength than said single band infrared radiation, and a sensitizer comprising a concentration of sensitizer ions in said host for sensitizing said activator in said host to said infrared radiation; an optical cavity for resonating said coherent radiation produced by said lasant material; and a pumping source for pumping said lasant material that has at least a quasi-continuous output of said single band infrared radiation.

DESCRIPTION OF THE INVENTION

Figure 1:
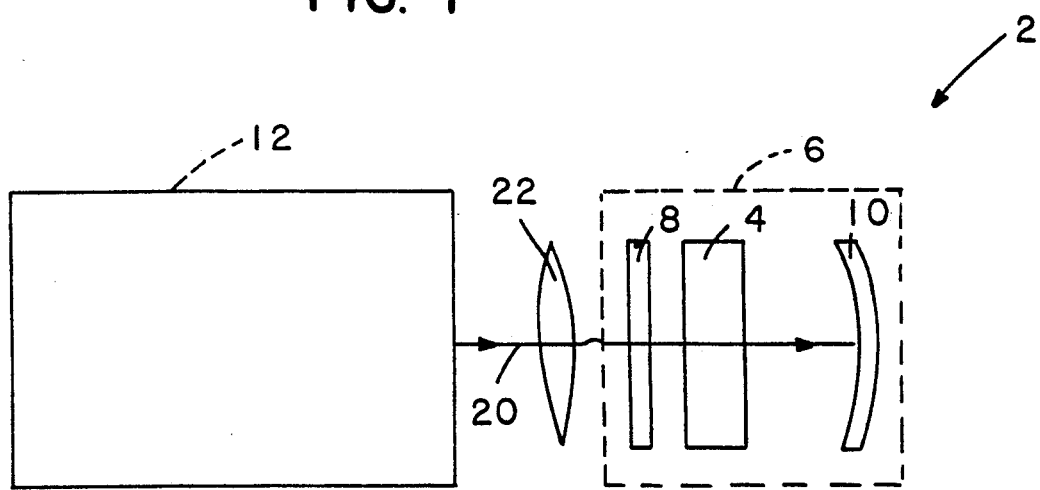
FIG. 1 is a schematic diagram of a laser system 2 that is suitable for incorporating the present invention.

Referring to the drawings, wherein reference characters designate like or corresponding parts throughout the views, FIG. 1 is a schematic diagram of a laser system 2 that is suitable for incorporating the present invention. The laser system 2 comprises a lasant material 4 within an optical cavity 6 formed by a reflector 8 and an output coupler 10. The lasant material 4 preferably comprises a fluoride crystal host, such as barium yttrium fluoride. Alternatively, the lasant material 4 may comprise a glass host, such as a fluoride glass host.

The lasant material 4 also comprises a rare earth activator material, such as thulium, that is preferably doped in the host. The concentration of thulium as a percentage of available rare earth sites in the host is in the range of 0.1 to 10 percent, preferably between approximately 0.1 and 2 percent, and ideally approximately 0.5 percent when the host comprises barium yttrium fluoride. Alternatively, erbium or holmium are suitable activator materials that may be doped in the host. The lasant material further comprises a sensitizer material, such as ytterbium, that is also preferably doped in the host. The concentration of ytterbium as a percentage of available rare earth sites in the host is in the range of 1 to 99.9 percent, preferably between approximately 5 and 99.9 percent, and ideally approximately 50 percent when the host comprises barium yttrium fluoride.

The laser system 2 also comprises a substantially single band pumping source 12 that comprises a source of at least quasi-continuous optical pumping radiation having at least one wavelength suitable for pumping the lasant material 4, this wavelength being in the infrared region of the electromagnetic spectrum. The pumping radiation provided by the pumping source 12 has a wavelength in the range of 830 to 1100 nm, preferably between approximately 920 and 1000 nm, and ideally the wavelength is approximately 960 nm.

Although the pumping source 12 is most advantageously a laser diode from the standpoint of economy and simplicity, for the suitable range of output wavelengths for the pumping radiation described above, it may alternatively comprise a solid state laser, such as a titanium sapphire laser that provides single band coherent radiation having a wavelength in the range of 830 to 1100 nm, preferably between 920 and 1000 nm, and ideally the wavelength is approximately 960 nm.

The pumping radiation produced by the pumping source 12 passes through a focussing lens 22 and penetrates the optical cavity 6 through the reflector 8 along an optical path 20 to impinge at least one surface of the lasant material 4. To this end, the reflector 8 is highly reflective at lasing wavelengths for which the laser system 2 is adjusted to provide coherent output radiation. If non-resonant pumping is desired, the reflector 8 is relatively transparent for wavelengths corresponding to the pumping radiation. If resonant pumping is desired, for instance, when the lasant material 4 is weakly absorbant for the pumping radiation or relatively thin, the reflector 8 is sufficiently reflective for wavelengths corresponding to the pumping radiation. The focusing lens 22 is useful to focus the pumping radiation from the pumping source 12 on the lasant material 4.

Figure 2:
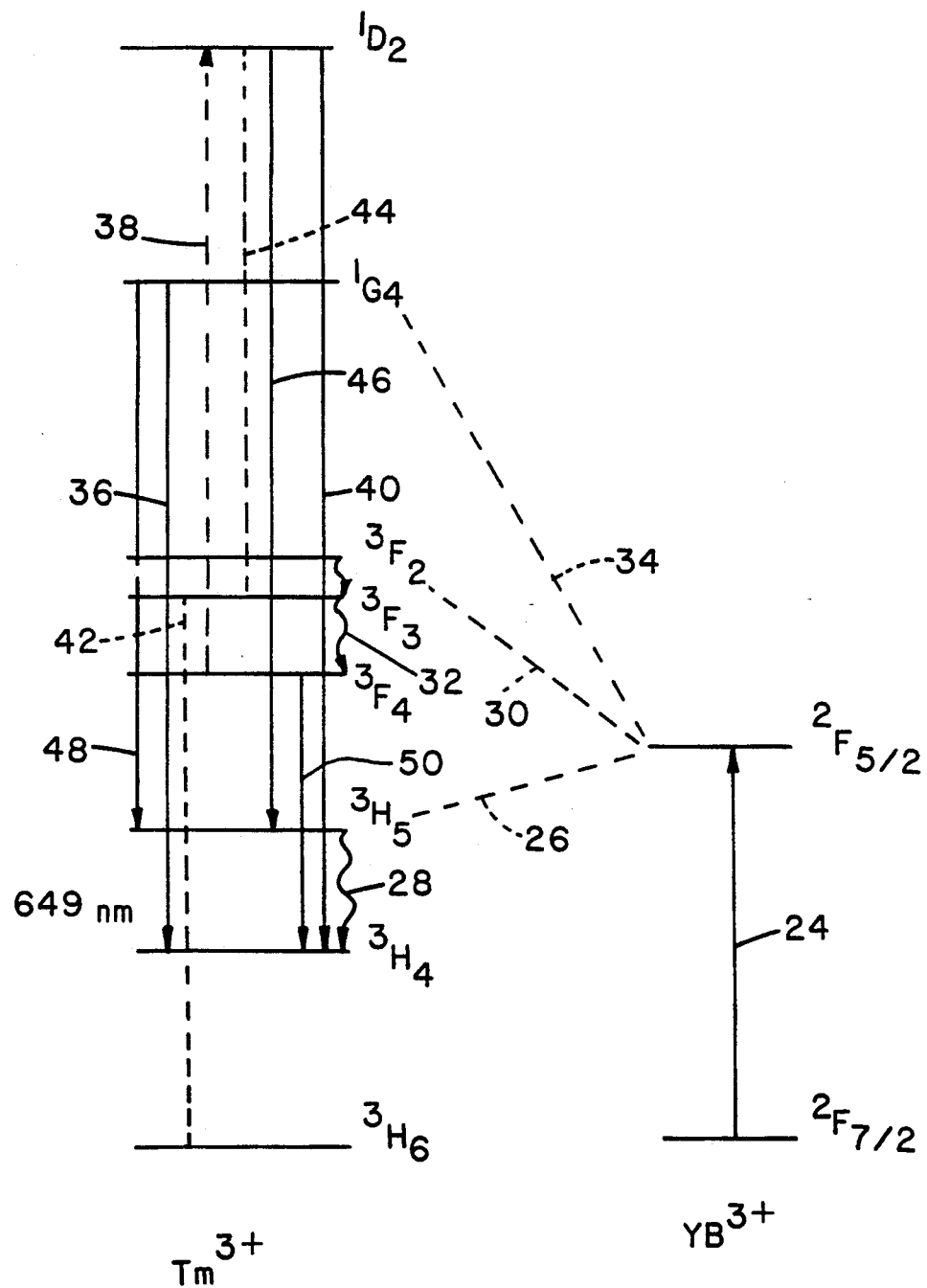
FIG. 2 is an energy state diagram for a first upconversion system according to the invention.

FIG. 2 is an energy level diagram that shows how the present invention produces upconversion action with three successive transfers of energy from the ytterbium sensitizer ions to the thulium activator ions that are doped in the lasant material 4. When the wavelength of the pumping radiation from the pumping source 12 along the optical path 20 is adjusted to be in the range of 830 to 1100 nm, the quantum energy level of at least some of the ytterbium sensitizer ions in the lasant material 4 is raised from the $^2F_{7/2}$ state to the $^2F_{5/2}$ state by absorption of the pumping radiation, as represented by a vector 24.

The quantum energy level of the ytterbium ions in the $^2F_{5/2}$ state then decays back to the $^2F_{7/2}$ state. In a first energy transfer from the sensitizer to the activator, the quantum energy level of at least some of the thulium activator ions is raised to the $^3H_5$ state from the $^3H_6$ state by substantially non-radiative transfer of energy that is released by the decay of the quantum energy level of the ytterbium sensitizer ions from the $^2F_{5/2}$ state back to the $^2F_{7/2}$ state, as represented by a broken line 26. The quantum energy level of the thulium ions in the $^3H_5$ state then rapidly decays, substantially non-radiatively, to the $^3H_4$ state, as represented by a wavy vector 28.

In a second energy transfer from the sensitizer to the activator, the quantum energy level of at least some of the thulium activator ions is raised to the $^3F_2$ state from the $^3H_4$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 30. The quantum energy level of the thulium ions in the $^3F_2$ state then rapidly decays, substantially non-radiatively, first to the $^3F_3$ state, and then to the $^3F_4$ state, as represented by a wavy vector 32.

In a third energy transfer from the sensitizer to the activator, the quantum energy level of at least some of the thulium activator ions is raised to the $^1G_4$ state from the $^3F_4$ state by substantially non-radiative transfer of energy that is released by a subsequent decay of the quantum energy level of the ytterbium sensitizer ions from the $^2F_{5/2}$ state back to the $^2F_{7/2}$ state, as represented by a broken line 34. The quantum energy level of the thulium ions in the $^1G_4$ state then radiatively decays to the $^3H_4$ state, as represented by a vector 36. The energy that is radiated by the decay of the thulium ions in the $^1G_4$ state to the $^3H_4$ state has a wavelength of approximately 649 nm. If the optical cavity 6 is made resonant for this wavelength, the reflector 8 has high reflectance for this wavelength and the output coupler 10 has sufficient reflectance at this wavelength to sustain lasing action, an upconversion laser system that operates with three successive energy transfers between the sensitizer and activator ions is secured.

Lasing can be produced at other wavelengths with this upconversion system. For instance, if the optical cavity is made resonant for a wavelength of approximately 455 nm, and the reflector 8 and the output coupler are both sufficiently reflective for a wavelength of approximately 649 nm, lasing action can be sustained at a wavelength of approximately 455 nm. This lasing action is due to either one, or both, of the following mechanisms that occur as a result of the three successive energy transfers to the thulium activator ions.

One mechanism is absorption of the radiation having a wavelength of approximately 649 nm that is produced by the decay of the quantum energy level of at least some of the thulium activator ions from the $^1G_4$ state to the $^3H_4$ state. This radiation is absorbed by at least some of the thulium activator ions that have a quantum energy level in the $^3F_4$ state as a result of the second energy transfer from the ytterbium sensitizer ions to the thulium activator ions described above.

The absorption of this radiation causes the quantum energy level of these ions to be raised to the $^1D_2$ state from the $^3F_4$ state, as represented by a broken line 38. The quantum energy level of the thulium ions in the $^1D_2$ state then radiatively decays to the $^3H_4$ state, as represented by a vector 40. The energy that is radiated by the decay of the thulium ions in the $^1D_2$ state to the $^3H_4$ state has a wavelength of approximately 455 nm. Since the optical cavity 6 is made resonant for this wavelength in this case, lasing can occur at this wavelength if enough energy transfer is provided by this mechanism.

Another mechanism that can produce radiation at approximately 455 nm is due to ion-to-ion energy transfer that can occur between at least some of those thulium activator ions occupying a quantum energy level in the $^3F_3$ state as a result of the second energy transfer from the ytterbium sensitizer ions to the thulium activator ions described above. In this case, the ion-to-ion energy transfer causes one energy releasing thulium activator ion that has a quantum energy level in the $^3F_4$ state to return to the $^3H_6$ state as represented by a broken line 42 and one energy absorbing thulium activator ion to have its quantum energy level raised to the $^1D_2$ state from the $^3F_3$ state as represented by a broken line 44.

The quantum energy level of the thulium ions in the $^1D_2$ state then radiatively decays to the $^3H_4$ state, as represented by the vector 40. The energy that is radiated by the decay of the thulium ions in the $^1D_2$ state to the $^3H_4$ state has a wavelength of approximately 455 nm. Since the optical cavity 6 is made resonant for this wavelength, lasing can occur at this wavelength if enough energy transfer is provided by this mechanism.

Even if the two mechanisms described above in connection with raising the quantum energy level of at least some of the thulium activator ions to the $^1D_2$ state are not by themselves capable of transferring sufficient energy to provide lasing at a wavelength of approximately 455 nm, the two mechanisms may be combined to provide sufficient energy transfer. If either one of the mechanisms is sufficient, however, the ion-to-ion mechanism is preferred.

Similarly, the upconversion system according to the invention as described above may provide lasing radiation having still other wavelengths that correspond to the decay of the quantum energy level of at least some of the thulium activator ions in the $^1D_2$ state to other states. For instance, at least some of the thulium activator ions in the $^1D_2$ state may decay to the $^3H_5$ state, producing substantially radiative decay that produces radiation having a wavelength of approximately 510 nm, as represented by a vector 46. If the optical cavity 6 is made resonant for approximately this wavelength and sufficient energy transfer is achieved, lasing can occur at this wavelength.

Likewise, the upconversion system according to the invention as described above may provide lasing radiation having still other wavelengths that correspond to the decay of the quantum energy level of at least some of the thulium activator ions in the $^1G_4$ state to other states. For instance, at least some of the thulium activator ions in the $^1G_4$ state may decay to the $^3H_5$ state, producing substantially radiative decay that produces radiation having a wavelength of approximately 799 nm, as represented by a vector 48. If the optical cavity 6 is made resonant for approximately this wavelength and sufficient energy transfer is achieved, lasing can occur at this wavelength.

The upconversion laser system 2 as shown in FIG. 1 may be used to provide lasing radiation at still other wavelengths with only two energy transfers from at least some of the ytterbium sensitizer ions to at least some of the thulium activator ions. In this case, at least some of the thulium activator ions that have a quantum energy level that has been raised to the $^3F_4$ state as a result of the second transfer of energy from at least some of the ytterbium sensitizer ions as described above are allowed to decay to the $^3H_4$ state. Radiation that has a wavelength of approximately 1.48 $\mu$m is produced as a result of this decay, as represented by a vector 50. If the optical cavity 6 is made resonant at approximately 1.48 $\mu$m, and sufficient energy transfer is achieved, lasing can occur at this wavelength.

In a specific implementation of the present invention as described above, the lasant material 4 comprises $BaY_{1.0}Yb_{0.99}Tm_{0.01}F_8$. The pumping source 12 typically comprises one or more laser diodes. In this case, the pumping source 12 supplies an output of approximately 100 mW at a wavelength of approximately 960 nm. The pumping source 12 alternatively may comprise a titanium sapphire laser. In this case, the pumping source 12 supplies an output of approximately 1 W at a wavelength of approximately 960 nm. The output of the pumping source 12 may be made quasi-continuous, such as with a chopper wheel, if desired, to prevent the lasant material 4 from overheating. Alternatively, the lasant material 4 may be suitably heat sunk or cooled to insure proper operation without overheating.

The present invention may be used in laser systems other than shown in FIG. 1 if desired. For instance, the lasant material 4 may be intra-cavity pumped instead of being pumped with a separate pumping source 12. In such instance, the lasant material 4 is placed within a portion of the optical cavity of the pumping source 12. Such a configuration may be desirable to achieve higher pumping efficiency or better economy. The present invention may also be used in ring cavity laser systems. Likewise, the lasant material 4 may comprise an optical fiber host, and the optical cavity 6 may comprise a length of the optical fiber host that is used in combination with suitable fiber optic couplings that approximate the functions of the reflector 8 and the output coupler 10 shown in FIG. 1.

Thus, there has been described herein an upconversion laser system that uses solid state components throughout and achieves such operation with a continuous or quasi-continuous pumping source using successive energy transfers between the sensitizer and activator in the host of the lasant upconversion material.

What is claimed is:

1. An upconversion laser system for converting relatively long wavelength, substantially single band infrared radiation that is at least quasi-continuous to relatively short wavelength optical radiation, comprising:
    an active lasant material that comprises a host, an activator that comprises a concentration of thulium activator ions as a percentage of available rare earth sites in said host is in the range of 0.1 to 10 percent to produce coherent radiation having a shorter wavelength than said infrared radiation, and a sensitizer that comprises a concentration of sensitizer ions in said host for sensitizing said activator in said host to said infrared radiation through at least two successive transfers of energy between said sensitizer and said activator;
    an optical cavity for resonating said coherent radiation produced by said lasant material; and
    a pumping source for pumping said lasant material that has at least a quasi-continuous output of said single band infrared radiation.

2. The laser system set forth in claim 1, wherein said concentration of ytterbium as a percentage of available rare earth sites in said host is in the range of 1 to 99.9 percent.

3. The laser system set forth in claim 2, wherein said concentration of thulium as a percentage of available rare earth sites in said host is between approximately 0.1 and 2 percent.

4. The laser system set forth in claim 3, wherein said concentration of ytterbium as a percentage of available rare earth sites in said host is between approximately 5 and 99.9 percent.

5. The laser system set forth in claim 4, wherein said concentration of thulium as a percentage of available rare earth sites in said host is approximately 0.5 percent.

6. The laser system set forth in claim 5, wherein said concentration of ytterbium as a percentage of available rare earth sites in said host is approximately 50 percent.

7. The laser system set forth in claim 4, wherein said pumping source provides said infrared radiation with a wavelength in the range of 830 to 1100 nm.

8. The laser system set forth in claim 7, wherein said pumping source provides said infrared radiation with a wavelength between approximately 920 to 1000 nm.

9. The laser system set forth in claim 8, wherein said pumping source provides said infrared radiation with a wavelength of approximately 960 nm.

10. The laser system set forth in claim 7, wherein said sensitizer in said lasant material absorbs said infrared radiation to raise the quantum energy level of said ytterbium ions from the $^2F_{7/2}$ state to the $^2F_{5/2}$ state.

11. The laser system set forth in claim 10, wherein said activator in said lasant material releases said coherent radiation when the quantum energy level of said thulium ions in said activator is raised to the $^1D_2$ state.

12. The laser system set forth in claim 11, wherein the quantum energy level of said thulium ions in said activator is raised to the $^3H_5$ state from the $^3H_6$ state by substantially non-radiative transfer of energy released by decay of the quantum energy level of said ytterbium ions in said sensitizer from the $^2F_{5/2}$ state back to the $^2F_{7/2}$ state.

13. The laser system set forth in claim 12, wherein the quantum level of said thulium ions in said activator that are raised to the $^3H_5$ state non-radiatively decays to the $^3H_4$ state.

14. The laser system set forth in claim 13, wherein the quantum energy level of said thulium ions in said activator in the $^3H_4$ state is raised to the $^3F_2$ state by substantially non-radiative transfer of energy released by decay of the quantum energy level of said ytterbium ions in said sensitizer from the $^2F_{5/2}$ state back to the $^2F_{7/2}$ state.

15. The laser system set forth in claim 14, wherein the quantum energy level of said thulium ions in said activator in the $^3F_2$ state substantially non-radiatively decays to the $^3F_3$ state.

16. The laser system set forth in claim 15, wherein said thulium ions in said activator having a quantum energy level in the $^3F_3$ state interact as energy absorbing and energy releasing ions to cause the quantum energy level of said energy absorbing ions to increase from the $^3F_3$ state to the $^1D_2$ state and to cause the quantum energy level of said energy releasing ions to decrease from the $^3F_3$ state to the $^3H_6$ state.

17. The laser system set forth in claim 16, wherein said thulium ions in said activator having a quantum energy level in the $^1D_2$ state release said coherent radiation as they decay to a lower energy state.

18. The laser system set forth in claim 16, wherein the quantum energy level of said thulium ions in said activator in the $^3F_4$ state are raised to the $^1G_4$ state by substantially non-radiative transfer of energy released by decay of the quantum energy level of said ytterbium ions in said sensitizer from the $^2F_{5/2}$ state back to the $^2F_{7/2}$ state.

19. The laser system set forth in claim 18, wherein said thulium ions in said activator having a quantum energy level in the $^1G_4$ state release said coherent radiation as they decay to a lower energy state.

20. The laser system set forth in claim 19, wherein the quantum energy level of said thulium ions in the $^1G_4$ state decays to the $^3H_4$ state, releasing said coherent radiation of approximately 649 nm.

21. The laser system set forth in claim 20, wherein the quantum energy level of said thulium ions in said activator in the $^3F_4$ state is raised to the $^1D_2$ state by excited state absorption of said coherent radiation produced by decay of the quantum energy level of said thulium ions in the $^1G_4$ state to the $^3H_4$ state.

22. The laser system set forth in claim 21, wherein said thulium ions in said activator having a quantum energy level in the $^1D_2$ state release said coherent radiation as they decay to a lower energy state.

23. The laser system set forth in claim 15, wherein the quantum energy level of said thulium ions in said activator in the $^3F_3$ state substantially non-radiatively decays to the $^3F_4$ state.

24. The laser system set forth in claim 23, wherein the quantum energy level of said thulium ions in said activator in the $^3F_4$ state are raised to the $^1G_4$ state by substantially non-radiative transfer of energy released by decay of the quantum energy level of said ytterbium ions in said sensitizer from the $^2F_{5/2}$ state back to the $^2F_{7/2}$ state.

25. The laser system set forth in claim 24, wherein said thulium ions in said activator having a quantum energy level in the $^1G_4$ state release said coherent radiation as they decay to a lower energy state.

26. The laser system set forth in claim 25, wherein the quantum energy level of said thulium ions in the $^1G_4$ state decays to the $^3H_4$ state, releasing said coherent radiation of approximately 649 nm.

27. The laser system set forth in claim 26, wherein the quantum energy level of said thulium ions in said activator in the $^3F_4$ state is raised to the $^1D_2$ state by excited state absorption of said coherent radiation produced by decay of the quantum energy level of said thulium ions in the $^1G_4$ state to the $^3H_4$ state.

28. The laser system set forth in claim 27, wherein said thulium ions in said activator having a quantum energy level in the $^1D_2$ state release said coherent radiation as they decay to a lower energy state.

29. The laser system set forth in claim 10, wherein said activator in said lasant material releases said coherent radiation when the quantum energy level of said thulium ions in said activator is raised to the $^1G_4$ state.

30. The laser system set forth in claim 29, wherein the quantum energy level of said thulium ions in said activator is raised to the $^3H_5$ state from the $^3H_6$ state by substantially non-radiative transfer of energy released by decay of the quantum energy level of said ytterbium ions in said sensitizer from the $^2F_{5/2}$ state back to the $^2F_{7/2}$ state.

31. The laser system set forth in claim 30, wherein the quantum level of said thulium ions in said activator that are raised to the $^3H_5$ state non-radiatively decays to the $^3H_4$ state.

32. The laser system set forth in claim 31, wherein the quantum energy level of said thulium ions in said activator in the $^3H_4$ state is raised to the $^3F_2$ state by substantially non-radiative transfer of energy released by decay of the quantum energy level of said ytterbium ions in said sensitizer from the $^2F_{5/2}$ state back to the $^2F_{7/2}$ state.

33. The laser system set forth in claim 32, wherein the quantum energy level of said thulium ions in said activator in the $^3F_2$ state substantially non-radiatively decays to the $^3F_4$ state.

34. The laser system set forth in claim 33, wherein the quantum energy level of said thulium ions in said activator in the $^3F_4$ state are raised to the $^1G_4$ state by substantially non-radiative transfer of energy released by decay of the quantum energy level of said ytterbium ions in said sensitizer from the $^2F_{5/2}$ state back to the $^2F_{7/2}$ state.

35. The laser system set forth in claim 34, wherein said thulium ions in said activator having a quantum energy level in the $^1G_4$ state release said coherent radiation as they decay to a lower energy state.

36. The laser system set forth in claim 10, wherein said activator in said lasant material releases said coherent radiation continuously when the quantum energy level of said thulium ions in said activator is raised to the $^3F_4$ state.

37. The laser system set forth in claim 36, wherein the quantum energy level of said thulium ions in said activator is raised to the $^3H_5$ state from the $^3H_6$ state by substantially non-radiative transfer of energy released by decay of the quantum energy level of said ytterbium ions in said sensitizer from the $^2F_{5/2}$ state back to the $^2F_{7/2}$ state.

38. The laser system set forth in claim 37, wherein the quantum level of said thulium ions in said activator that are raised to the $^3H_5$ state non-radiatively decays to the $^3H_4$ state.

39. The laser system set forth in claim 41, wherein the quantum energy level of said thulium ions in said activator in the $^3H_4$ state is raised to the $^3F_2$ state by substantially non-radiative transfer of energy released by decay of the quantum energy level of said ytterbium ions in said sensitizer from the $^2F_{5/2}$ state back to the $^2F_{7/2}$ state.

40. The laser system set forth in claim 42, wherein the quantum energy level of said thulium ions in said activator in the $^3F_2$ state substantially non-radiatively decays to the $^3F_4$ state.

41. The laser system set forth in claim 43, wherein said thulium ions in said activator having a quantum energy level in the $^3F_4$ state release said continuous coherent radiation as they decay to a lower energy state.

42. An upconversion laser system for converting relatively long wavelength, substantially single band infrared radiation that is at least quasi-continuous to relatively short wavelength optical radiation, comprising:

an active lasant material that comprises a host, an activator that comprises a concentration of erbium activator ions in said host for producing coherent radiation having a shorter wavelength than said infrared radiation, and a sensitizer that comprises a concentration of sensitizer ions in said host for sensitizing said activator in said host to said infrared radiation through at least two successive transfers of energy between said sensitizer and said activator;

an optical cavity for resonating said coherent radiation produced by said lasant material; and a pumping source for pumping said lasant material that has at least a quasi-continuous output of said single band infrared radiation.

43. The laser system set forth in claim 42, wherein said sensitizer comprises ytterbium.

44. An upconversion laser system for converting relatively long wavelength, substantially single band infrared radiation that is at least quasi-continuous to relatively short wavelength optical radiation, comprising:

an active lasant material comprising a host, an activator that comprises a concentration of holmium activator ions in said host for producing coherent radiation having a shorter wavelength than said infrared radiation, and a sensitizer that comprises a concentration of sensitizer ions in said host for sensitizing said activator in said host to said infrared radiation through at least two successive transfers of energy between said sensitizer and said activator;

an optical cavity for resonating said coherent radiation produced by said lasant material; and a pumping source for pumping said lasant material that has at least a quasi-continuous output of said single band infrared radiation.

45. The laser system set forth in claim 44, wherein said sensitizer comprises ytterbium.

46. An upconversion laser system for converting relatively long wavelength, substantially single band infrared radiation that is at least quasi-continuous to relatively short wavelength optical radiation, comprising:

an active lasant material that comprises a fluoride crystal host, an activator comprising a concentration of rare earth activator ions in said host for producing coherent radiation having a shorter wavelength than said infrared radiation, and a sensitizer comprising a concentration of sensitizer ions in said host for sensitizing said activator in said host to said infrared radiation through at least two successive transfers of energy between said sensitizer and said activator;

an optical cavity for resonating said coherent radiation produced by said lasant material; and a pumping source for pumping said lasant material that has at least a quasi-continuous output of said single band infrared radiation.

47. The laser system as set forth in claim 46, wherein said host comprises barium yttrium fluoride.

48. An upconversion laser system for converting relatively long wavelength, substantially single band infrared radiation that is at least quasi-continuous to relatively short wavelength optical radiation, comprising:

an active lasant material comprises a fluoride glass host, an activator comprising a concentration of rare earth activator ions in said host for producing coherent radiation having a shorter wavelength than said infrared radiation, and a sensitizer comprising a concentration of sensitizer ions in said host for sensitizing said activator in said host to said infrared radiation through at least two successive transfers of energy between said sensitizer and said activator;

an optical cavity for resonating said coherent radiation produced by said lasant material; and a pumping source for pumping said lasant material that has at least a quasi-continuous output of said single band infrared radiation.

* * * * *